United States Patent [19]

Benn et al.

[11] Patent Number: 4,604,711
[45] Date of Patent: Aug. 5, 1986

[54] AIRCRAFT FLIGHT DATA DISPLAY SYSTEM

[75] Inventors: George Benn, Bellevue; Wendell Frost, Renton; Chris Knudsen, Federal Way; David Nieuwsma, Renton, all of Wash.

[73] Assignee: Sundstrand Data Control, Inc., Redmond, Wash.

[21] Appl. No.: 421,743

[22] Filed: Sep. 23, 1982

Related U.S. Application Data

[63] Continuation-in-part of Ser. No. 401,206, Jul. 23, 1982, abandoned.

[51] Int. Cl.[4] .............................................. G06F 15/20
[52] U.S. Cl. ..................................... 364/900; 364/424
[58] Field of Search ... 364/200 MS File, 900 MS File, 364/424, 439; 340/971, 973, 974, 977, 978, 980; 434/43; 360/5, 6, 71; 369/21

[56] References Cited

U.S. PATENT DOCUMENTS

| | | | |
|---|---|---|---|
| 3,421,151 | 1/1969 | Wong et al. | 364/900 |
| 3,461,429 | 8/1969 | Gray . | |
| 3,752,917 | 8/1973 | Foley et al. | 178/6.8 |
| 4,149,148 | 4/1979 | Miller et al. | 340/721 |
| 4,212,064 | 7/1980 | Forsythe et al. | 340/971 |
| 4,247,843 | 1/1981 | Miller et al. | 340/750 X |
| 4,312,041 | 1/1982 | DeJonge | 364/442 |

OTHER PUBLICATIONS

Gaiger, B.-"The Challenges of Digital Flight Data Recorder Read-Out and Analysis"-Sep. 1979. .

Primary Examiner—Thomas M. Heckler
Attorney, Agent, or Firm—James A. Gabala; Ted E. Killingsworth; Harold A. Williamson

[57] ABSTRACT

In order to provide timely aircraft performance data from an aircraft flight data recorder in a useful format, a flight data display system is provided: with a data storage unit; an interface circuit for reformatting flight data from the flight data recorder; a central processor for converting selected portions of the reformatted data into engineering units and storing the converted data into the storage unit; and a video display unit including a keyboard for selecting the desired portions of the reformatted flight data for display on the video display unit. The video display unit provides for the multicolor display of flight data in either graphical form or in a cockpit instrument form on a cathode ray tube.

50 Claims, 5 Drawing Figures

FIG. 4B

AIRCRAFT FLIGHT DATA DISPLAY SYSTEM

CROSS-REFERENCE TO RELATED APPLICATIONS

This application is a continuation-in-part of the abandoned application Benn et al Ser. No. 401,206, filed July 23, 1982 and entitled Aircraft Flight Data Display System.

BACKGROUND OF THE INVENTION

The invention relates to the field of aircraft copy display systems and in particular to aircraft flight data display systems that can visually display flight data directly from an aircraft flight data recorder.

Most of the commercial aircraft flying today are equipped with flight data recorders for recording various aircraft flight parameters such as altitude, airspeed, heading and engine data. The primary purpose for recording aircraft flight data is to provide flight data for accident analysis but the flight data recorded on the aircraft has also proven useful to airline management for other purposes including aircraft maintenance and incident analysis such as a landing approach resulting in a hard landing or a go-around. With the advent of modern digital flight data recorders that are capable of storing over a hundred different flight parameters, the usefulness of the data to the airline operating and maintenance personnel has expanded dramatically. The availability of a large number of flight parameters has made possible significant improvements in the safety as well as economics of flight operations by permitting management to analyze actual flight data. However, in order to be useful, this data must be made available to management in a timely manner and in useful formats.

A review of the prior art methods for producing aircraft flight data from a flight data recorder for analysis by airline personnel has revealed a number of significant disadvantages in these methods. Typically the data from the digital flight data recorder, which is stored in bit serial form, has to be converted into a format that can be used as input to a large mainframe computer system. After the data from the digital flight data recorder is reformatted, the mainframe computer system converts the data into the appropriate engineering units and this data is then printed out in tabular form or plotted for analysis. This process has several disadvantages one of which is a substantial delay in making the data available. For example reformatting or transcribing the data typically takes several hours and further delays often occur because the transcription equipment is remote from the location of the large mainframe computer. Also it has been found that the use of the company base computer can lead to priority problems where the data conversion and tabulation processes quite often have to compete with other business functions of the machine resulting in further delays.

Along with the delays in making the data available, a further disadvantage of the current procedure results from the fact that large quantities of computer printout are produced requiring extensive engineering time to examine and analyze. Thus the processes historically used by airline management to obtain flight data lacks the flexibility to present timely data in a form that would be most useful to operating and engineering personnel.

One form of flight data display that has been determined to be quite useful is cockpit animation where the flight data can be viewed on a simulated cockpit instrument panel as discussed in a paper presented at the ISASI Annual Seminar, September 1979, entitled "The Challenges of Digital Flight Data Recorder Readout and Analysis" by B. Caiger. This paper discusses cockpit animation from an accident analysis standpoint, but it has been discovered that this type of display also has advantages to airline management. For example this format is particularly useful in reviewing incidents with pilots who are used to evaluating flight data in a cockpit environment. However, as pointed out above, to be useful to operating management, flight data must be made available on a timely and convenient basis.

SUMMARY OF THE INVENTION

It is the object of the invention to provide a system for displaying flight data from an aircraft digital flight data recorder which includes: a data storage unit; an input unit for accepting flight data from a data source and for reformatting and storing the flight data in the data storage unit; a processor for converting selected portions of the reformatted flight data into engineering units and storing the converted flight data in the storage unit; and a video display unit including a keyboard effective to cause the processor to select portions of the reformatted flight data for conversion into flight data engineering units and to display the converted flight data.

It is an additional object of the invention to provide for the direct display of selected digital flight data from an aircraft flight data recorder with a system that includes a data storage unit, an input unit, a processor for converting selected portions of the flight data into engineering units in response to a sync word in the data while flight data from the source of flight data is being stored in the data storage unit and a display unit for displaying the data converted into engineering units.

It is a further object of the invention to provide for the direct display of selected aircraft flight parameters from an aircraft digital flight data recorder with a display system that includes an interface circuit connected to the flight data recorder for converting serial flight data into flight data words; a data storage unit for temporarily storing the data words; and a data processor for causing the interface circuit to input serial flight data from the flight data recorder and to convert the serial data into a word format, storing the flight data words in a first predetermined location in the data storage unit, converting said flight data words into scaled flight data, and storing the scaled flight data in a second predetermined location in the data storage unit; the system also includes a display unit responsive to the processor for visually displaying the scaled flight data stored in the data storage unit.

It is another object of the invention to provide a system for the display of flight data derived from an aircraft flight data recorder that includes: a source of raw flight data; an interface unit effective to reformat the raw flight data; a high-speed random access memory; a bulk memory; a central processing unit effective to cause the interface unit to load the reformatted raw flight data into a first location in the random access memory, to convert selected portions of the raw flight data into engineering units and to store the converted flight data in a second location in the random access memory; and a visual display unit effective to display the converted flight data stored in the second location in the random access memory.

A still further object of the invention is to provide a system for the display of aircraft data from an aircraft flight data recorder that includes: a high speed random access memory; a bulk memory unit including a configuration file defining selected flight data for a predetermined aircraft; and a central processing unit effective to sequentially load blocks of raw flight data from a raw flight data source into a first predetermined location within the random access memory, to select a number of the data conversion parameters, as defined by the configuration file, to be loaded into a second location within the random access memory, to convert selected portions of the raw flight data into engineering units utilizing the selected data conversion parameters, and to store the converted flight data in a third location within the random access memory. The system also includes a visual display unit having a cathode ray tube effective to write a static cockpit display on the cathode ray tube and to display said converted flight data in the static cockpit display.

DETAILED DESCRIPTION OF THE INVENTION

Figure 1:
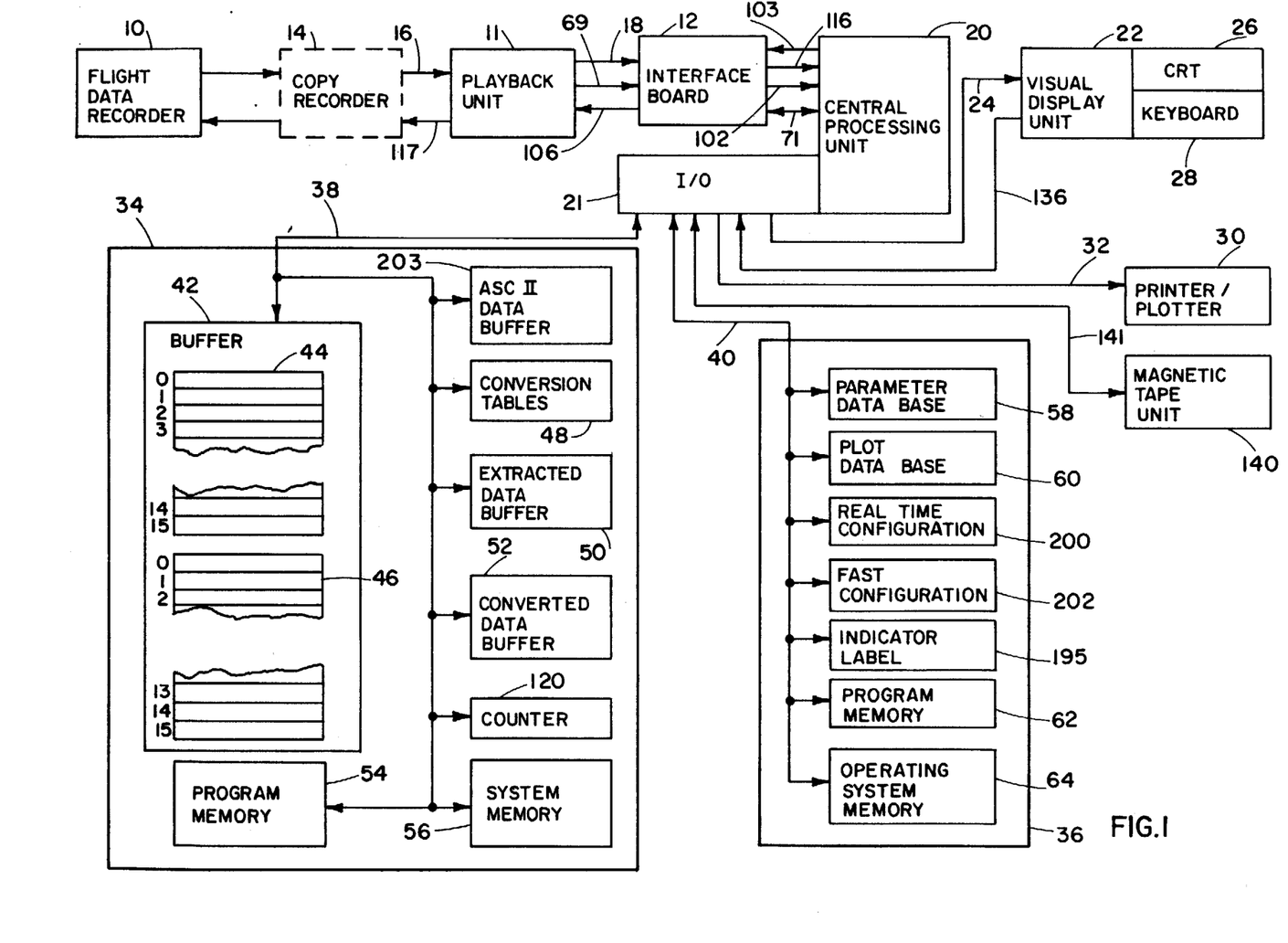
FIG. 1 is a functional block diagram of an aircraft flight data display system.

FIG. 1 provides an overall functional block diagram of the preferred embodiment of a system for directly displaying selected aircraft performance data from a digital flight data recorder.

Aircraft performance data relating to such factors as aircraft speed, altitude, vertical acceleration, engine pressure ratios and pitch and roll attitudes is accumulated and stored during flight in an aircraft flight data recorder indicated at 10. Some of the more recent flight data recorders such as the Sundstrand Data Control universal flight data recorder part no. 980-4100 are capable of storing twenty-five flight hours of over one hundred different flight parameters. In a digital flight data recorder such as the one indicated at 10, what can be termed as raw flight data is typically stored in a bit serial format consisting of frames that in turn are divided into four subframes each one of which consists of sixty-four twelve bit words. Formats of the data stored in commercial flight data recorders are described in the ARINC specifications 573 and 717 published by Aeronautical Radio, Inc., Annapolis, Md. Each subframe represents one second's worth of aircraft performance data. In most cases each of the twelve bit words represents an aircraft flight parameter such as altitude or airspeed with some parameters such as vertical acceleration being recorded several times during the one second intervals and therefore appearing in more than one word in a subframe. Similarly some types of data such as engine speeds are recorded only once in every frame or once every four seconds. The first word in each subframe consists of a sync word which both serves to mark the beginning of a subframe and to identify the subframe. Currently there are two different subframe formats, depending upon the manufacture of the data accumulation equipment installed in the aircraft. The binary values of the ARINC 573 sync words are provided below:

| SUBFRAME | FORMAT 1<br>Binary Value | FORMAT 2<br>Binary Value |
| --- | --- | --- |
| 1 | 111 000 100 100 | 001 001 000 111 |
| 2 | 000 111 011 010 | 010 110 111 000 |
| 3 | 111 000 100 101 | 101 001 000 111 |
| 4 | 000 111 011 011 | 110 110 111 000 |

When it is desired to obtain and analyze the flight data contained in a flight data recorder 10, the flight data recorder 10 itself can be connected directly to a playback unit 11 that is associated with aircraft flight data display system shown in FIG. 1. However, since it is often impractical to remove the flight data recorder 10 from the aircraft, it may be more convenient to use a copy recorder as indicated by the dash line 14 to record the data from the flight data recorder 10 on the aircraft and then connect the copy recorder 14 as indicated by line 16 to the playback unit 11. Commercially available copy recorders such as the Sundstrand Data Control copy recorder part no. 981-6024-001 are capable of recording over twenty-five hours of flight data in approximately thirty minutes thereby eliminating the necessity for physically removing the flight data recorder 10 from the aircraft.

One function of the playback unit 11 is to control the flight data recorder 14. For example in a digital flight data recorder the playback unit 11 can write a marker on the tape, command the tape to run in a forward or reverse direction and sequence through the tape tracks. The playback unit 11 also serves as a preprocessor of the data on the flight data recorder 10 or copy recorder 14 by squaring and decoding biphase signals into non-return to zero signals. Playback units are commercially available such as the Sundstrand Data Control playback unit part no. 981-1218.

Connected to the playback unit 11 by means of a data line 18 is an interface board 12 connected to the central processing unit 20 of a mini-computer system such as the Data General Nova Model 4S which is a sixteen bit mini-computer and includes an input-output board 21. The central processing unit 20 is also connected through the I/O board 21 to a visual display unit 22 as indicated by line 24 which preferably includes a color graphics terminal having a color display cathode ray tube 26 and a keyboard 28. In the preferred embodiment of the invention the color graphics visual display unit 22 is the Advanced Electronic Design, Inc. AED 512 color graphics imaging terminal that is described in detail in the AED 512 Users' Manual available from Advanced Electronics Design, Inc. of Sunnyvale, Calif. which is incorporated herein by reference. For some applications it may be desirable to connect a printer/plotter 30 as indicated by line 32 to the central processing unit 20 in order to produce tabular data in printed or plotted black and white form.

Another integral portion of the aircraft flight data display system as shown in FIG. 1 is the memory arrangement which in the preferred embodiment includes a high speed random access memory 34 along with a lower speed bulk memory 36 which is preferably a disc memory: either floppy or fixed disc. As indicated in FIG. 1, the memory is connected, as represented by a data line 38, to the central processing unit 20 as is the bulk memory 36 indicated by the line 40. In the embodiment of the invention shown in FIG. 1 the random access memory 34 is a part of the random access memory normally supplied with the Nova 4S computer. The organization of the high speed random access memory in the aircraft flight data display system includes a buffer portion 42 in a predetermined location in the random access memory 34 that is organized into a first buffer 44 and a second buffer 46. Each of the buffers 44 and 46 are organized in sixteen subframes each of which in turn are broken down into sixty-four sixteen bit words. In addition to the buffer memory the high speed random access memory 34 includes a set of conversion tables to aid in converting the raw aircraft performance data from the flight data recorder 10 into data in engineering units 48, an extracted data buffer 50 for temporarily storing selected portions of the raw aircraft performance data extracted from the buffer 42 and a converted data buffer 52 for temporarily storing aircraft performance data that has been converted and scaled into engineering units. As is conventional, the random accesss memory 34 also includes a predetermined location 54 for storing at least a portion of the computer program driving the central processor 20 and a location 56 for storing the computer operating system. The bulk or disc memory 36 includes a portion 58 for storing a parameter data base, a portion 60 for storing a plot data base as well as portions 62 and 64 for storing the computer program and the computer operating system.

Figure 2:
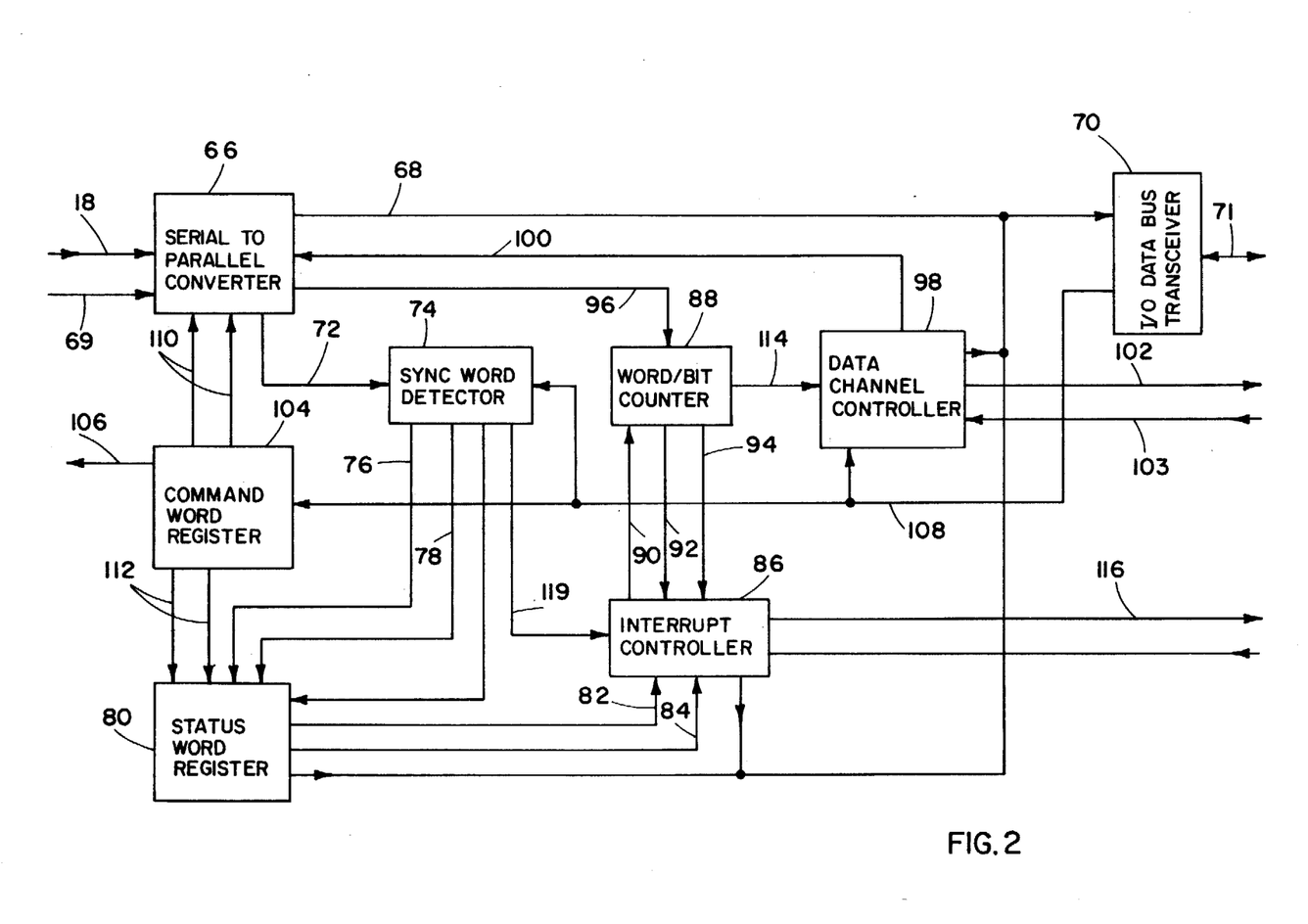
FIG. 2 is a functional block diagram of an interface unit for use with the aircraft flight data display system of FIG. 1.

In FIG. 2 is provided a detailed functional block diagram of the interface board 12 which in the preferred embodiment is implemented on a circuit board within the computer. Bit serial flight data from the flight data recorder or the copy recorder 14 is transmitted over the data line 18 through the playback unit 11 and on data line 18 to a serial to parallel converter 66. The serial to parallel converter 66 includes two 8 bit shift registers for converting the serial data received on line 18 to twelve bit parallel words which then are transmitted by means of a data bus 68 to an I/O data bus transceiver 70. The serial to parallel converter also includes a data register for temporarily storing the twelve bit data word long enough so that it can be transmitted via the data bus 68 to the random access memory 34. A new twelve bit data word is latched into the data register every twelve strobe cycles which are transmitted from the playback unit 12 over a line 69. The data bus 68 is a sixteen bit parallel data bus in order to conform with the sixteen bit data system of the central processor unit 20 and as a result the most significant four bits of each data word applied to the bus 68 are zeroed out. As shown in FIG. 2 the I/O data bus transceiver 70 is connected to a data bus 71 for transmitting data to the central processing unit 20 or the high speed random access memory 34 shown in FIG. 1 via the I/O board 21. Also connected to the serial to parallel converter 66 by means of a twelve bit data bus 72 is a sync word detector 74. The sync word detector 74 includes four twelve bit data registers for holding the four sync words which are being sought as well as four comparator circuits which are effective to generate signals on a pair of lines 76 and 78 to indicate which of the four sync words have been detected. Connected to the lines 76 and 78 is a status word register 80. The status word register in turn is connected by means of a pair of control lines 82 and 84 to an interrupt control circuit 86.

Along with the status word register 80, a word/bit counter circuit 88 is connected to the interrupt controller 86 by means of a pair of control lines 90 and 92 and a clock signal line 94. The word/bit counter 88 receives the strobe signal over line 96 which represents each bit received by the serial to parallel converter 66 over the line 18 from the flight data recorder 10 or the copy recorder 14. Thus the word/bit counter 88 is effective to count the number of data bits being received by the interface board of FIG. 2 and to generate the appropriate control signals to the interrupt controller 86 along with the clock signal that increments a word counter in the word/bit counter 88. In addition the word/bit counter 88 contains a status register containing accumulated word/bit counts per subframe.

The interface board of FIG. 2 also includes a data channel controller 98 operatively connected to the serial to parallel converter 66 by means of a control line 100 and to the central processing unit 20 by means of control lines 102 and 103.

Also included in the interface circuit of FIG. 2 is a command word register 104 that is connected either to the copy recorder 14 or the flight data recorder 10 by means of a control line 106. The command word register 104 provides a means for controlling the playback unit 11. Information is transmitted from the central processing unit 20 over the data bus 18 through the I/O data bus transceiver to the data channel controller 98, the sync word detector 74, and the command word register 104 by means of a data bus 108. It should also be pointed out that the interrupt controller 86, the status word register 80 and the data channel controller 98 are connected to the input data bus 68 along with the serial to parallel converter circuit 66. The serial to parallel converter 66 and the status word register 80 are also connected by means of control lines to the command word register 104 by control lines 110 and 112 respectively. Similarly the word/bit counter 88 is connected to the data channel controller 98 by means of a clock signal line 114 and the sync word detector 74 is connected to the interupt controller 86 by means of a control line 119. Interrupt signals are generated by the interrupt controller 86 and transmitted directly to the central processing unit 20 over the control line 116. Detailed design criteria with respect to communication of the interface board 12 with the preferred central processing unit is provided in the "User's Manual Interface Designer's Reference, Nova and Eclipse Line Computers" publication no. 014-000/629-00 of the Data General Corporation incorporated by reference herein.

The process of providing a visual display of aircraft flight data from the flight data recorder 10 on the visual display unit 22 begins with the initialization of the interface circuit 12 by the central processing unit 20 of FIG. 1. Under control of the central processing unit 20 resulting from the logic program stored in the program memory 54 the appropriate sync words are transmitted over the data bus 71 to the interface board of FIG. 2 and by means of the output data bus 108 to the registers in the sync word detector 74. A hardware word address indicating the location of the first word in the first buffer 42 in the high speed random access memory 34, where the aircraft flight data that has been converted to twelve bit words by the serial to parallel converter 66 is to be stored, is similarly transmitted over the input data bus 71. This address is stored in a register in the data channel controller 98. In order to provide a data path to the central processing unit 20 and memory 34, a data channel request signal is transmitted from the data channel controller 98 on line 102 to the central processing unit 20 and acknowledged by a signal on line 103. After the sync word detector 74 has been initialized with the appropriate sync words, a start signal is transmitted from the command word register 104 over the line 106 to the playback unit 11 and then by means of a control line 117 to either the copy recorder 14 or the data recorder 10 depending on which one is connected to the playback unit 11.

When the start signal has been received the flight data recorder 10 or the copy recorder 14 will start transmitting the flight parameter data via the playback unit 11 to the serial to parallel converter 66. At the same time each twelve bit parallel word is generated in the serial to parallel computer 66, line 114 is strobed to indicate a word has been formed. Line 102 is strobed to request access to the data channel. After data channel acknowledge signal 103 is returned from the CPU 20, the parallel word is transferred on line 118 through the data bus transceiver 70 to the buffer 42. This flight parameter data which has been converted to the twelve bit word format is transmitted by means of line 72 to the sync word detector 74 and when any one of the four sync words has been detected by the sync word detector 74 a sync interrupt signal is generated and transmitted by means of line 119 to the interrupt controller 86. At the same time the particular sync word is identified by the status word register 80 from the signals on lines 76 and 78 which serve to identify the particular sync word found by the sync word detector. From the information contained in the status word register 80 the central processing unit 20 calculates the memory address where the particular subframe of data as identified by the sync word should be stored in the buffers 44 or 46 of the high speed random access memory 34 and that address is transmitted to the address register in the data channel controller 98. For example if the first sync word detected represented the third subframe the hardware memory address calculated by the central processing unit 20 would be the start of the subframe "2" as shown in buffer 44.

Once a sync word has been identified by the sync word detector 74 the interface board FIG. 2 then begins to directly transfer the synchronized raw flight parameter data by means of the I/O data bus transceiver 70 over the data bus 71 through a dedicated data channel directly to the locations in the buffer memories 42 as indicated by the address contained in the address register in the data channel controller 98. Each time the word/bit counter 88 detects twelve bits, the clock signal is transmitted on line 114 which increments the word address in the word register of the data channel controller 98 thereby resulting in the next data word being placed in the next word of the buffer memory 42. As each subframe in the buffer memory 42 is filled, a count of the subframes is kept by the central processing unit 20 in a counter 120 in the random access memory 34. When the last subframe "15" in the second buffer 46 has been filled, the central processing unit 20 will cause the system to start writing the data in the first buffer 44 by suppling the address of the first word in that buffer to the data channel controller. In this manner only a limited amount of random access memory is required for processing the flight data. Since the flight parameter data is being automatically transmitted directly to the buffer memory 42 the central processing unit 20 is free to begin to convert the raw flight parameter data contained in the buffer units into engineering units such as feet, knots or degrees for display by the visual display unit 22.

One of the primary functions of the word counter in the word/bit counter 88 is to count the number of data words received since the last sync word was detected by the sync word detector 74. When the count reaches 63, a clock signal generated on line 94 signifies that the last data word of a subframe is about to be received. This has the effect of putting the interface board onto a sync search mode. When the next sync word is detected by the sync word detector 74 both of the bit and word counters in the word/bit counter 88 are reset to zero.

One of the functions of the word/bit counter 88 is to count the number of data bits received by the serial to parallel converter 66. In the event that 65 words have been received by the serial to parallel converter 66 and a sync word has not been detected by the sync word detector 74 an overflow signal is generated in the interrupt controller 86 over line 92 causing the central processing unit 20 to interrupt the conversion process and to calculate a memory address for the buffer memory based on an assumption of the nature of the flight data received and where it should be stored in the buffer memory 42. This memory address is then transmitted to the address register in the data channel controller 98. In addition the CPU 20 will cause error flags to be set in the buffer memory indicating that this particular flight data being loaded in the buffer memory is questionable or may be in error. In addition the central processing unit 20 creates the appropriate reformatted sync words to be stored in the buffer memory 42 for the data that has been received without the sync word being detected by the sync word detector 74. In this manner it is possible to continue to load flight performance data in the buffer memory 42 and make it available to the display unit 22 even when a sync word has not been detected so that valuable flight performance data is not lost just because there may be an error in the sync word contained in the data.

Before the data conversion process can take place, usually during initialization of the system, the appropriate parameters and flight data units must be selected. This is usually done by an operator utilizing the keyboard 28 of the visual display unit. When the appropriate flight data parameters and units have been selected, this information is transmitted by the visual display unit 22 to the central processing unit 20 which then causes the appropriate parameters from the parameter data base 58 to be transmitted from the bulk memory 36 to the conversion tables 48 in the high speed random access memory 34. After the initialization has been completed, selected flight parameters, for example airspeed or altitude, are removed from the raw flight performance data contained in the buffer 42 and placed in the extracted data buffer 50. This process is only started after an interrupt has been generated on line 116 by the interrupt controller 86 so that a full subframe is identified and stored in the first appropriate location in the first buffer 44 and it is possible to ensure that the appropriate data words from this first subframe loaded in the buffer memory 44 are available for loading into the extracted data buffer 50. In particular after a full subframe of data has been loaded in the first buffer memory 44, the information contained in the conversion tables 48 is used to determine word location within the subframe and the data bits within the word to be accessed in order to extract the portions of the raw data which represent the selected flight parameter value. This extracted raw data is then placed in the extracted data buffer 50. The conversion of raw data to data that is scaled in the appropriate engineering units occurs after all of the selected parameters have been transferred from the subframe in the buffer memory 44. Associated with each flight parameter is a parameter code contained within the conversion tables 48 that determines the specific process for converting the raw flight data into the appropriate scaled engineering units for display on the visual display unit.

The processor 20 converts the flight parameters of interest from raw data values to engineering units by use of unique conversion processes keyed to the parameter code. The conversion process proceeds with the system sequentially comparing the table of requested parameter types with its own table of possible parameter types. When a match between tables is found, the system branches to apply the unique conversion process for the respective parameter type. Once the raw data is converted to the final engineering units value, it is stored in the converted data buffer 52 and a process for maximum/minimum limits exceedance checking, if requested during initialization, is performed. This procedure assigns maximum or minimum values to predefined flight parameters such as altitude or airspeed so that if these values are exceeded by the actual flight data an indication can be flashed on the CRT 26 of the visual display unit 22.

All parameters (excluding BCD and discrete parameters) defined in the parameter database 58 can have, along with their unique scale factor and offset, a look-up table consisting of from 2 to 40 pairs of data values and corresponding engineering units. In general, after the offset and scale factor have been applied to the raw data value giving an intermediate engineering units result, linear interpolation into the look-up table is accomplished if the table exists. The general flow of the conversion process is as follows:

raw data: offset and scale factor
  intermediate result: look-up table final engineering units In the detailed explanation of the conversion process the following abbreviations are used:

EU—final calculated Engineering Units
IR—intermediate result after one or more calculation steps
R1—raw data least significant word
R2—raw data most significant word
R3—raw data third word (pneumatic altitude conversion algorithm index)
SD—syncro angle in degrees
FD—fine syncro angle in degrees
CD—coarse syncro angle in degrees Parameter type: A1
(analog parameter from single data word)
  $IR = (R1 - \text{offset}) * \text{scale factor}$
  EU = IR: table look-up Parameter type: A2
(analog parameter from two data words)
  $IR = (R2 * 4096) + R1$
  $IR = (IR - \text{offset}) * \text{scale factor}$
  EU = IR: table look-up Parameter type: D1
(digital (signed) parameter from single data word)
  (sign may be from a second data word)
  $IR = (+/-) R1$
  $IR = (IR - \text{offset}) * \text{scale factor}$
  EU = IR: table look-up Parameter type: D2
(digital (signed) parameter from two data words)
  (sign must be from second data word)
  $IR = (R2 * 4096) + R1$
  $IR = (+/-) IR$
  EU = IR: table look-up Parameter type: X1
(discrete parameter from single data word)
  EU = R1

Parameter type: X2
(discrete parameter from two data words)
  $EU = (R2 * 2) + R1$ Parameter type: G2
(GMT coded as a BCD value in two data words)
  EU = HH:MM (hours and minutes converted from BCD to ASCII characters)

Parameter type: H1
(linear (Hamilton Standard) syncro from single data word)
  SD = R1: linear syncro conversion
  $IR = (SD - \text{offset}) * \text{scale factor}$
  EU = IR: table look-up Parameter type: H2
(linear (Hamilton Standard) syncro from two data words (altitude))
  CD = R2: linear syncro conversion
  FD = R1: linear syncro conversion if CD is greater than or equal to 350 degrees then CD = CD − 360
  $IR = ((CD * 375) - (FD * 13.889))/5000$
  IR = IR: rounded to nearest integer value
  $IR = (FD * 13.889) + (IR * 5000)$
  $IR = (IR - \text{offset}) * \text{scale factor}$
  EU = IR: table look-up Parameter type: T1
(non-linear (Teledyne) syncro from single data word)
  SD = R1: non-linear syncro conversion
  $IR = (SD - \text{offset}) * \text{scale factor}$
  EU = IR: table look-up Parameter type: T2
(non-linear (Teledyne) syncro from two data words (altitude))
  CD = R2: non-linear syncro conversion
  FD = R1: non-linear syncro conversion if CD is greater than or equal to 350 degrees then CD = CD − 360
  $IR = ((CD * 375) - (FD * 13.889))/5000$
  IR = IR: rounded to nearest integer value
  $IR = (FD * 13.889) + (IR * 5000)$
  $IR = (IR - \text{offset}) * \text{scale factor}$
  EU = IR: table look-up Parameter type: P1
(pneumatic parameter from single data word (UFDR pneumatic airspeed))
  IR = R1 * 0.0025: voltage
  IR = (IR * scale factor) − offset: PSID
  IR = IR * 144000: PSFD * 1000
  IR = IR: interpolated from pressure vs. airspeed table
  EU = IR: table look-up Parameter type: P3
(pneumatic parameter from three data words (UFDR pneumatic altitude))
  choose conversion algorithm based upon the value of R3 (conversion algorithm index)
    index 0—determine transducer calibration factors from table 0 index 1—determine transducer calibration factors from table 1
index 2 to 7—determine transducer calibration factors from table 0
conversion algorithm for index 0 to 7:
TT=R2/10.2: transducer temperature
OT=: calibration factor interpolated from indexed table by temperature TT
KT=: calibration factor interpolated from indexed table by temperature TT
IR=(4096−R1) * 0.0025
IR=(IR−OT)/(0.414 * KT)
IR=IR−offset: PSIA
IR=IR * 144000.0: PSFA * 1000
IR=IR: interpolated from pressure vs. altitude table
EU=IR: table look-up After the flight data parameters have been scaled into the appropriate engineering units they are stored in the converted data buffer 52. The information contained within the converted data buffer 52 is then translated by the central processing unit into a format that is compatible with the particular visual display unit 22 for direct display on the cathode ray tube 26. It should also be noted that this information may be transmitted directly over a line 32 to the printer/plotter 30 for tabular listing or a plot of the aircraft flight parameter data if so desired.

Figure 3:
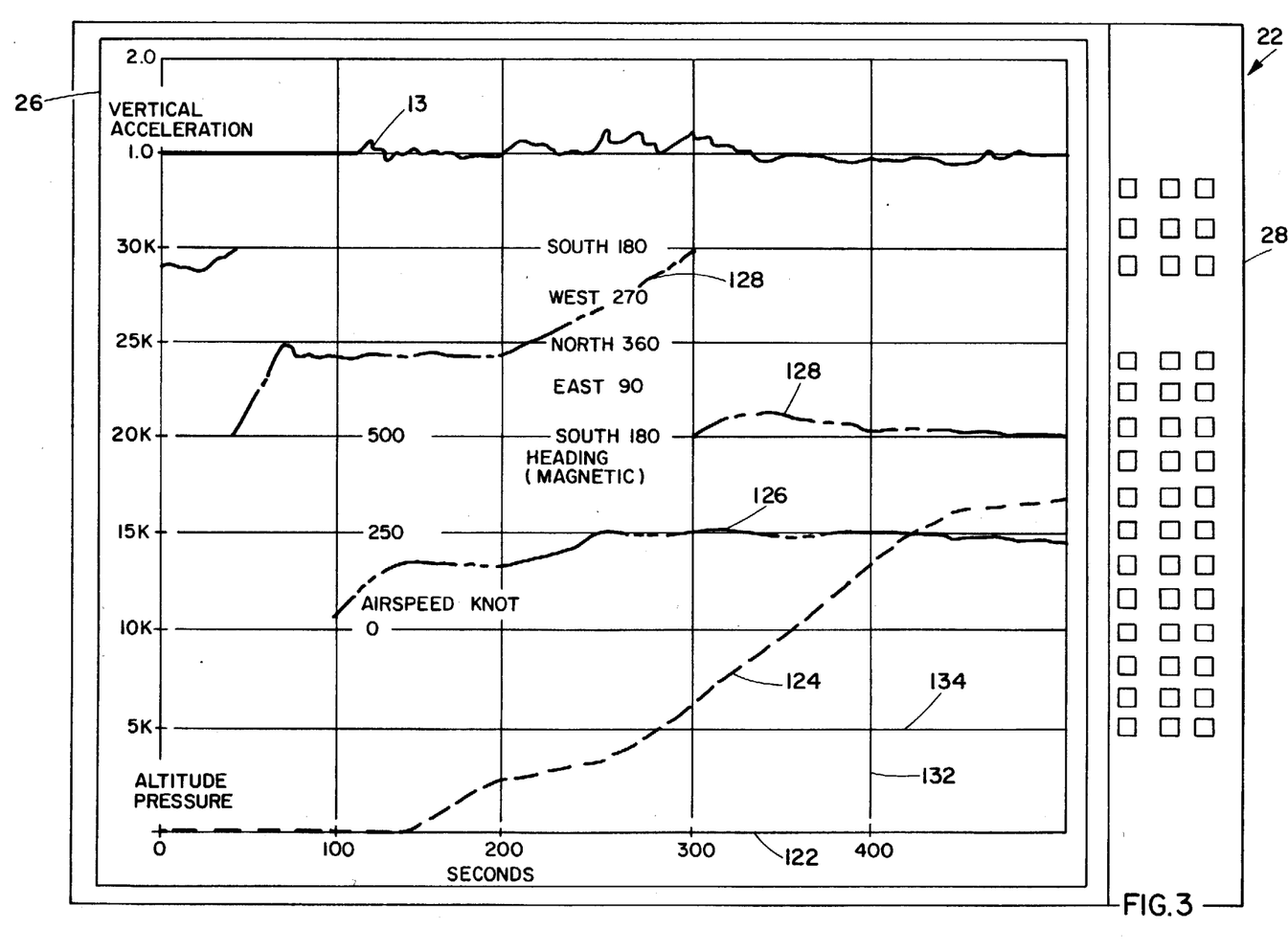
FIG. 3 is an illustration of a visual display unit with an example of a graphical display of flight data.

In FIG. 3 is provided an illustration of the graphical output of the flight data display system. A front view of the visual display unit 22 is shown with a representative example of a graphical display of flight data projected on the CRT 26. In this example four flight parameters: altitude, airspeed, heading and vertical acceleration are plotted against time in seconds on the lower vertical axis 122 for an aircraft during take-off. The dashed line 124 represents aircraft altitude; the double dot line 126 represents airspeed; the single dot line 128 represents magnetic heading and the solid line 130 represents vertical acceleration. Values for the flight parameters are displayed on a segmented grid represented by lines 132 and 134. Since the preferred visual display unit 22 is a color graphics terminal, the various portions of the display are produced in color wherein for instance the altitude line 124 is yellow, the airspeed line 126 is green, the heading line 128 is light blue and the vertical acceleration line 130 is red with the segmented grid lines 132 and 134 in dark blue. In this particular case the display on the CRT 26 is generated one segment or pixel at a time and scrolled to the left. The central processing unit 20 will provide one second worth of data from the converted data buffer 52 at a time so that the visual display unit 22 can generate the display pixel by pixel. Then an operator by using the keyboard 28 can scroll the display on the CRT 26 to the right or the left to view the desired data.

Since the visual display unit 22 serves to both initialize and control the system by means of the keyboard 28 resulting in signals transmitted to the central processing unit 20 on line 136, an operator can define the desired flight parameters and start the input of flight data from the flight data recorder 10 or copy recorder 14 into the system by using the keyboard 28. In the preferred embodiment, up to eight different flight parameters along with two discretes can be displayed at any one time. The operator additionally has the ability to control the operation of the copy recorder 14 through the keyboard 28 by commanding it to: start, stop, select a particular track, hold or continue by means of the control functions transmitted through the central processing unit 20 and the playback unit 11. Also, because the preferred visual display unit has a zoom capability, the operator is able to enlarge or focus in on any particular flight parameter that he is interested in by utilizing the controls on the keyboard 28.

In addition to the type of graphical display shown in FIG. 3, there are certain circumstances when it is particularly useful to display the aircraft flight data within the context of flight instruments. An example of such a display is provided in FIGS. 4A and 4B. Here, a representation of various cockpit instruments is drawn on the CRT 26 and the aircraft flight data is represented by various moving pointers or numerical displays that serve to provide an operator with an indication of aircraft performance similar to that that a pilot would receive in the cockpit of an aircraft.

In order to provide maximum flexibility for displaying data in the cockpit environment, the raw flight data from the flight data recorder 10 in FIG. 1 is transmitted, in the preferred embodiment of the invention, to the playback unit 11 and reformatted by the interface board 12 and the central processing unit 20 in the same manner as previously described. But, instead of converting the data loaded into the buffer memories 44 and 46 by the I/O board 21 into engineering units, the raw flight data is blocked into records comprised of 16 subframes (1 buffer full) and loaded by the central processing unit 20 on to a magnetic tape in a magnetic tape unit 140 over a line 141. The magnetic tape unit 140 may be any suitable commercially available computer controlled unit utilizing a nine-track magnetic tape and each record or block of raw flight data consisting of 16 subframes is identified with a sequential record number. For those situations where a tape contains data for more than one aircraft or more than one flight, each group of records can be identified by a file number. The raw flight data is loaded on the tape in magnetic tape unit 140 in the block format in order to provide a convenient means for controlling the speed at which the cockpit display is generated so that for example the display can be generated in real time. Real time display being defined as the display of data at the rate that the actual events occurred. Although in the preferred embodiment of the invention the cockpit display is normally produced in real time, it can be displayed in a fast mode which is approximately five times faster than real time. Thus in the fast mode of display approximately five minutes of flight data would be displayed in one minute.

Operator control of the magnetic tape unit 140 via the central processing unit 20 is provided by means of specially labeled keys on the visual display unit keyboard 28. Procedures for setting up the special function keys are described in the AED 512 Users' Manual previously identified. In this process signals generated in the visual display unit 22 in response to keystrokes are transmitted over line 136 to the central processing unit 20 which controls the operations described below. Among the special function keys provided for in the preferred embodiment of the invention are a stop key, a start key, a hold key and a continue key. The function of the start key is to start the magnetic tape unit 140 after the system has been initialized and to start displaying the data from the magnetic tape unit 140. The stop key serves to terminate the display process and to return the system to the initialization status. The hold key serves to hold or freeze the display of data on the CRT 26. To unfreeze the display, the continue key will cause the system including the magnetic tape unit 140 to continue displaying flight data from the data records in sequence. A particularly useful function is a go-to-record command which, when entered into the visual display unit 22 by means of the keyboard 28, will result in the magnetic tape unit reading a predetermined record for the start of the display process. The number of the desired record is entered by means of a REC_____command typed on the keyboard 28 of the visual display unit 22.

When the system is initialized, the operator utilizing the keyboard 28 can identify the starting record number containing the block of data that is of interest to be displayed. Also during initialization, the operator selects real time or fast mode playback. If real time is selected, all of the parameters identified for display on the particular aircraft designated will be displayed in a real time mode on the CRT 26. Thus in real time one minute of flight will take one minute to play back from the magnetic tape unit 140. In the event that the fast mode playback is selected, only about one-fourth of the total number of parameters will be animated for display on the CRT 26. In this manner a flight may be viewed in a much shorter time than real time, and it provides an operator with, in effect, a search mode to identify that phase of flight that may be of most interest for viewing. Also, since a tape may contain several data files and since the area of interest often is not at the beginning of a tape file, the operator, by utilizing the special function keys and commands as previously described along with the file number and the record number, can select that particular record holding the block of data that would represent the flight data of primary interest. For example, if it is known that the aircraft is entering a take-off mode of flight at approximately record 124, that record can be entered directly into the system from the magnetic tape unit 144 without the necessity for the operator having to view a hundred or so records waiting for the aircraft to take off.

Figure 4A:
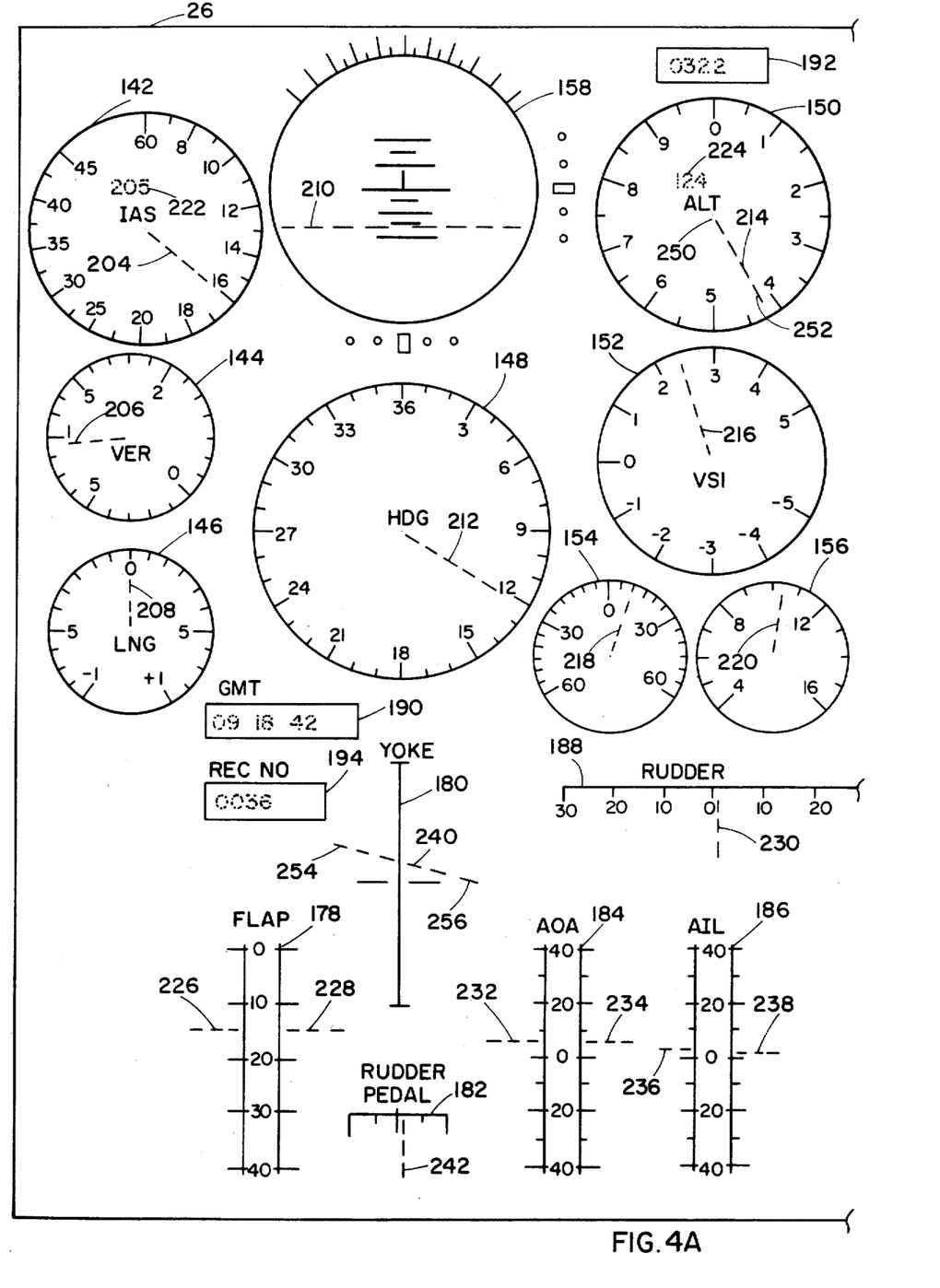
FIGS. 4A an 4B provide another example of a display of flight data on the visual display unit but in a cockpit format.
Figure 4B:
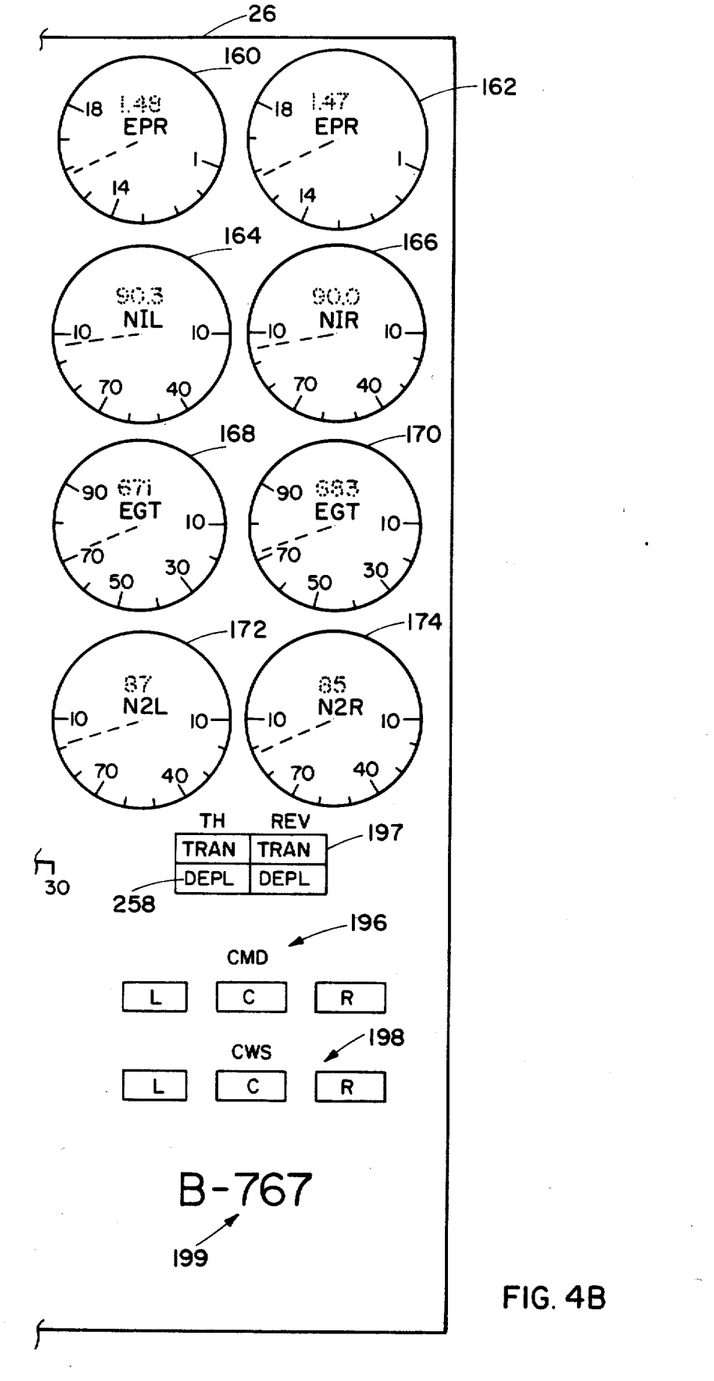

During initialization, a static cockpit display is generated on the CRT 26. An example of a cockpit display is provided in FIGS. 4A and 4B wherein, it should be noted, that both FIG. 4A and FIG. 4B would be combined in a single display on the CRT 26. For the purpose of representation, the static portion of the cockpit display is drawn in FIGS. 4A and 4B in solid black lines. In this example, FIGS. 4A and 4B illustrate a set of instruments that would be useful in displaying flight data for a Boeing 767 type aircraft. As shown in FIG. 4A there is a dial 142 for indicated airspeed (IAS), a dial 144 for vertical acceleration (VER), a dial 146 for horizontal acceleration (LNG), a dial 148 for heading (HDG), a dial 150 for altitude (ALT) and a dial 152 for vertical speed (VSI). There are also dial indicators 154 and 156 in FIG. 4A for static air temperature (SAT) 154 and cabin absolute pressure (CAB) 156. The pitch and roll attitude of the aircraft is also indicated by a circular ADI instrument 158.

Dial indicators are provided in FIG. 4B for various engine operating parameters for each engine of a B767. These dial indicators include engine pressure ratios 160 and 162, inlet turbine speeds 164 and 166, exhaust gas temperature 168 and 170 and turbine RPMs 172 and 174.

In the portion of the display shown in FIG. 4A there are also position indicator displays including a flap position indicator 178, a control column and wheel (yoke) indicator 180, a rudder pedal indicator 182, an angle of attack indicator 184 and an AIL indicator 186. There is also a rudder angle indicator 188.

In the static display of FIGS. 4A and 4B there are also provisions made for displaying discrete flight parameters in digital form. These digitally displayed parameters include parameters that are displayed in a box 190 for Greenwich mean time and box 192 for radio altitude. There is also a provision in a box 194 for the display of the record number which represents the record number on the magnetic tape of the block of flight data being displayed. It should also be understood that along with the boxes 190, 192 and 194 each of the letters drawn in heavy black lines in FIGS. 4A and 4B is also part of the static display. These letters include IAS, VER, LNG, HDG, ALT, VSI, SAT, CAB, GMT, REC NO, YOKE, RUDDER, FLAP, AOA, AIL, EPR, N1L, N1R, EGT, N2L and N2R. The numbers in the static portion of the dial indicators 142–174 are stored in an indicator label file 195 in the bulk memory 36.

In addition to the displays described above provision is also made for the display of certain discrete indicators such as a thrust reverser position indicator as shown at 197 of FIG. 4B. In the static display, normally only the TH and the REV will be displayed and the letters inside the box 197 indicating whether the thrust reversers are in transition or deployed are only displayed in response to specific discrete data inputs from the raw flight data. Similarly there are discrete displays for left, center and right autopilot status CMD and CWS as indicated at 196 and 198 respectively. Also, since the system has the capability of displaying data for a large variety of aircraft, it is considered useful to display the type of aircraft for which the flight data is being displayed as shown at 199.

At the time that the static cockpit display is initialized, a color table in the visual display unit 22 is generated to allow the instrument drawing as shown in FIGS. 4A and 4B and to provide for the display of actual data in various colors. After the static cockpit display is drawn, most of the colors are write protected to prevent erasure of the static screen image while the moving display is generated. Procedures for generating the static display and generating the color table are described in detail in the AED 512 Users' Manual.

One of the salient features of the preferred embodiment of the invention is to provide a display system that is capable for use with a variety of aircraft types. To this end, the bulk memory 36 is provided with two configuration files 200 and 202. The first configuration file 200 is a real time configuration file which serves to determine which flight parameters will be displayed for a particular aircraft in real time. An example of the parameters displayed for the Boeing B767 type aircraft is provided in FIGS. 4A and 4B. Similarly the flight parameters to be displayed in the fast mode are identified in the fast configuration file 202. When the operator indicates the start of the display process by using the start key and desired blocks of raw flight data on the magnetic tape unit 140 are identified by a record number, the central processing unit 20 will cause the magnetic tape unit to load one block of raw flight data into the buffer 44 of the random access memory 34. The appropriate configuration file 200 or 202 identifies by means of unique parameter identification numbers the parameter conversions in the parameter data base 58 that are to be used in converting the raw data in the buffer 44 into engineering units. Under control of the central processing unit 20 the specific parameter conversion factors for conversion into engineering units contained within the parameter data base 58 as identified by either the real time configuration file 200 or the fast configuration file 202 are loaded into the conversion table 48. As described previously the central processing unit 20 in response to instructions contained within the program memory 54 extracts the raw flight data parameters from the data buffer 44 to be converted and then converts them to engineering units. It should be noted that in the case of conversion to engineering units for the cockpit display of FIGS. 4A and 4B only one data buffer 44 is used instead of two data buffers 44 and 46 as in the previously described data conversion process. After the data has been converted to engineering units the central processing unit 20 begins to process the flight data in such a manner that it can be used by the visual display unit 22. As indicated before if real time has been selected, the formatting and display process will be for all of the parameters indicated in FIGS. 4A and 4B whereas if the fast mode of display has been selected only a portion of those parameters will be formatted and displayed as defined by the fast configuration file 202. By selecting only a limited number of parameters to be converted in the fast mode, the computing requirement of the central processing unit 20 can be significantly reduced thereby making it possible to use a significantly less expensive computer.

Another approach to providing a forward scanning capability is to select only a limited number of subframes from each block of data in the buffer memory 44. For instance if only one subframe for each block is converted, the conversion and hence display speed can be increased by a factor of about sixteen. This process produces a rather discontinuous display but in some circumstances it can be used to identify the part of the flight that is of interest.

In the reformatting and display process, the central processing unit 20 converts the data from engineering units into units compatible with the particular display and initiates the display driver process in the visual display unit 22 resulting in the display of flight data within the static display on the cathode ray tube 26. Before a parameter is displayed digitally, the number must be converted to ASCII format. This number in the ASCII format is temporarily stored in an ASCII data buffer 203 in the random access memory 34. For the dial indicators such as the altimeter 150 the data to be displayed must first be changed into a rotational format. The rotational format is required to provide pointers for the dial indicators such as the IAS 142, altimeter 150 and the heading 148. In FIGS. 4A and 4B the flight data to be displayed is indicated by dashed lines for the pointers and in a dotted representation for the digital data. The pointer for the indicated airspeed is shown as dashed line 204, the vertical acceleration indicator by dashed line 206, the longitudinal acceleration by dashed line 208, the aircraft attitude by dashed line 210, the aircraft heading by dashed line 212, the altitude indicated by dashed line 214, the vertical speed indicator by dashed line 216, the static air temperature by dashed line 218 and the cabin pressure by dashed line 220. In addition to analog pointers 204 and 214, the airspeed dial 142 includes a digital display 222 and the altimeter 150 includes a digital display 224. The actual position of various control surfaces such as the flaps are indicated by dashed lines 226 and 228 for the left and right flaps respectively. The position of the rudder is indicated by the dashed line 230. Similarly the two measurements of angle of attack are indicated by dashed lines 232, 234. Position of the left and right aileron is indicated by the dashed lines 236 and 238 respectively. Of particular use is the display of the position of the control column and wheel (yoke) against the static yoke line 180. Control column position information is conveyed by moving a dashed line 240 up and down and wheel position is indicated by the tilt of dashed line 240. The position of the rudder pedals is indicated by a dashed line 242.

On or off status of discretes such as the thrust reversers 197 or the autopilot discretes 196 and 198 are indicated by changing the color table at the position that indicates that the discrete is on or off. Typically the inactive state is indicated by changing the color in which the discrete is written to a color that will not show up against the background color of the CRT 26 so that the discrete appears to be off.

In the preferred embodiment of the invention there are five different processes by which the flight data in engineering units is reformatted by the central processing unit 20 into a format suitable for display by the visual display unit 22 in a cockpit instrument form. The five general processes by which the flight data has been converted to engineering units is reformatted for display on the CRT 26 are illustrated in the following numbered paragraphs:

1. Dial indicator display process.

As an example of the generation of a dial indicator pointer, the process by which the central processing unit 20 produces instructions for generating the dial pointer 214 for an altimeter reading of 12,410 feet includes:

$x,y$ = the center of dial coordinates at point 250 on the CRT 26

$L$ = length of pointer 214

$x',y'$ = coordinates at end of pointer at point 252 on the CRT 26

Scale factor: $\frac{2 \times \pi \text{ radians}}{1000 \text{ ft.}}$ $SF$ = Scale factor = .006283185

Offset: $\phi$ radians = 0 feet $OS$ = offset = $\phi$ $\alpha$ = Angle = $EU \times SF + OS$ $\alpha$ = Angle = 12,410 feet $\times$ .006283185 $\frac{\text{radians}}{\text{feet}}$ + $\phi$ radians =

77.9743 radians

Instructions sent by the central processing unit 20 to the visual display unit 22:

1. Move to center of dial (x,y)
2. Change to black color
3. Draw black line to old x',y' (erasing old line)
4. Move to x,y
5. x'=L * sin ($\alpha$)
6. y'=L * cos ($\alpha$)
7. Change to white color
8. Draw white line to x',y'

2. The two parameter combination indicator display process.

As an example of the generation of a two parameter indicator, the process by which the central processing unit 20 produces instructions for displaying the control wheel and column (yoke) position 240 in right bank, forward elevator position includes:

$x,y$ = the left end 254 of indicator line 240

$x',y'$ = the right end 256 of indicator line 240

$L$ = ½ length of indicator line 240

$(CC)$ Offset = 135 pixels $(CC)$ Scale factor = $\frac{100 \text{ pixels}}{20°}$ = 5

$(CW)$ Offset = 90° = $\pi/2$ radians $(CW)$ Scale factor = $\frac{2\pi \text{ radians}}{360°}$ = 0.017453

$CC$ = Control Column = $EU * 5 + 135$ $CW$ = Control Wheel = $(EU + 90°) * 0.017453$ Instructions sent by the central processing unit 20 to the visual display unit 22:
1. Move to old x,y
2. Change color to black
3. Draw black line to old x',y' (erase old line)
4. x'=L * sin (CW)
5. y'=L * cos (CW)+CC
6. x=L * sin (CW+π)
7. y=L * cos (CW+π)+CC
8. Move to x,y
9. Change color to cyan
10. Draw line to x',y'

3. The linear position indicator display process.

As an example of the generation of a linear position indicator, the process by which the central processing unit 20 produces instructions for generating the left flap indicator line 226 for a flap position of 14 degrees includes:

Offset = 100 pixels

Scale Factor = $\frac{80 \text{ pixels}}{40° \text{ of flap}}$ = 2

$L$ = length of indicating line 226

Flap = $(EU * 2) + 100$

Instructions sent by the central processing unit 20 to the visual display unit 22:
1. Move to x, old y (old Flap)
2. Change to black color
3. x'=x+L
4. Draw line to x', old y
5. Move to x, Flap (new y)
6. Change to cyan color
7. Draw line to x', FLAP 4. The digital display process.

As an example of the generation of a digital display, the process by which the central processing unit 20 produces instructions for generating the Radio altimeter 192 display includes:

$x,y$ = starting location of text in box 192

Raw Data → convert to ASCII → store in buffer 203 of FIG. 1

Instructions sent by the central processing unit 20 to the visual display unit 22:
1. Move to x,y
2. Change to cyan color
3. Leave interpreter (AED instruction)
4. Send text from ASCII buffer 203
5. Enter interpreter 5. The discrete indicator process.

As an example of the generation of a discrete display, the process by which the central processing unit 20 produces instructions for generating the discrete display 258 indicating that the left thrust reverser is deployed includes:

D=discrete value=1 or $\phi$

The letters DEPL 258 are written in color C

Instructions sent by the central processing unit 20 to the visual display unit 22:
1. If D=1 (active), then set color table for C to magenta.
2. If D=0 (not active), then set color table for C to very dim red (not visible).

It should be understood that the letters, such as DEPL indicated at 258, in the box 197 are drawn on the CRT 26 as part of the static display and are made visible to an operator by changing the color of the display as described above.

The aircraft flight data system as described provides a system for displaying flight data from an aircraft flight data recorder in a flexible and convenient manner that is particularly useful to airline operating management. Also, by organizing and processing the raw flight data utilizing the hardware components including the high speed random access memory 34, the disk memory 36 and the magnetic tape memory 140 as set forth, it is possible to display a large amount of flight data in color using relatively inexpensive equipment such as the minicomputer 20.

We claim:

1. A system for displaying flight data from an aircraft flight data recorder, comprising:
   a data storage unit;
   input means, operatively connected to a source of the flight data from the flight data recorder and to said data storage unit, for reformatting and storing the flight data in said data storage unit, said input means including a sync word detector circuit for detecting sync words in the flight data;
   processor means, operatively connected to said input means and said data storage unit, for converting selected portions of said reformatted flight data into engineering units and storing said converted flight data in said storage unit; and
   a video display unit including a keyboard operatively connected to said processor effective to cause said processor means to select said portion of said reformatted flight data for conversion into engineering units and to display said converted flight data in the form of cockpit instruments.

2. The system of claim 1 wherein said visual display unit includes a cathode ray tube operatively connected to said central processing unit to write a static cockpit display on said cathode ray tube and to display said converted flight data in said static cockpit display.

3. The system of claim 2 wherein said central processing unit is additionally effective to reformat said converted flight data in said data storage unit into flight data display instructions and coordinates and to transmit said flight data display instructions and coordinates to said visual display unit.

4. The system of claim 3 wherein said central processing unit is additionally effective to reformat selected portions of said converted flight data into ASCII format and storing said selected reformatted data in a predetermined location in said data storage unit and to transmit said selected reformatted data from said predetermined location to said visual display unit for display in numerical form in said static cockpit display.

5. The system of claim 2 wherein said central processing unit is responsive to an operator initiated signal from said visual display unit to cause said display of converted flight data to occur at a second rate substantially greater than real time.

6. The system of claim 1 wherein said input means includes a circuit for generating flight data storage addresses in said data storage means.

7. The system of claim 6 wherein said data storage means inlcudes a high-speed random access memory and said addresses represent locations in said high-speed random access memory.

8. The system of claim 1 wherein said processor means performs said conversion of said selected portions of flight data into engineering units while said input means is reformatting and storing the flight data and while said visual display unit is displaying said converted flight data.

9. A system for the direct display of flight data from an aircraft flight data recorder comprising:
   data storage means for storing data;
   input means, operatively connected to a source of the flight data from the flight data recorder and to said data storage means, for storing flight data that includes sync words in said data storage means;
   processor means, operatively connected to said input means and said data storage means, for converting selected portions of the flight data into engineering units in response to one of the sync words while flight data from said source of flight data is being stored in said data storage means; and
   display means, operatively connected to said processor means, for displaying said selected portions of flight data converted into engineering units in the form of cockpit instruments.

10. The system of claim 9 wherein said processor includes means for causing said input means to store the flight data in said data storage means.

11. The system of claim 10 wherein said input means includes means for changing the format of the flight data from the aircraft flight data recorder into a format compatable with said data storage means.

12. The system of claim 10 wherein said input means includes detector means for detecting the sync words and generating a sync signal.

13. The system of claim 12 wherein said processor means responds to said sync signal by storing the flight data in a first predetermined location in said data storage means.

14. The system of claim 13 wherein said processor means initiates said conversion of flight data stored in said predetermined location in response to said sync signal.

15. The system of claim 14 wherein said processor includes means for storing said converted portions of flight data in a second predetermined location in said data storage means.

16. The system of claim 9, 10, 11, 12, 13, 14 or 15 wherein said processor means responds to a signal from said display means to initiate storing of the flight data from the source of flight data in said data storage means.

17. A system for the direct display of selected aircraft flight data from an aircraft flight data recorder, comprising:
   interface means, operatively connected to the flight data recorder, for receiving serial flight data from the flight data recorder and converting said serial flight data into flight data words;
   data storage means for temporarily storing data;
   processor means operatively connected to said interface means and said data storage means for: causing said interface means to receive said serial flight data from the flight data recorder and to convert said serial flight data to said flight data words, storing said flight data words in a first predetermined location in said data storage means, converting selected flight data from said flight data words into scaled flight data, and storing said scaled flight data in a second predetermined location in said data storage means;
   detector means for detecting a sync word in said serial flight data and generating a sync signal identifying the sync word detected;
   counter means, operatively connected to said processor means, for counting said flight data words and generating an overflow signal indicating that a predetermined number of flight data words have been received and transmitted to said first predetermined location without a sync work being detected;
   data overflow means, responsive to said overflow signal, for tentatively identifying said flight data words; and
   display means, operatively connected to said processor means, for visually displaying said scaled flight data stored in said second predetermined location in the form of a cockpit instrument array.

18. The system of claim 17 wherein said interface means includes detector means for detecting a sync word in said serial flight data and generating a sync signal identifying the sync word detected and wherein said processor means includes means for initiating said conversion of flight data words into said scaled flight data in responce to said sync dignal.

19. The system of claim 18 wherein said interface means includes means reponsive to said sync signal for directly loading said flight data words into said first predetermined location.

20. The system of claim 19 wherein said processor means includes means responsive to said sync signal for generating an address in said first predetermined location for storing said flight data words in sequence and transmitting said address to said interface means.

21. The system of claim 20 wherein said interface means includes means for transmitting said flight data words to said first predetermined location prior to identifying a sync word.

22. The system of claim 17 wherein said data storage means includes conversion factors stored in a third predetermined location.

23. The system of claim 22 wherein said processor means includes means for extracting predetermined elements of flight data from said first predetermined location and storing said flight data elements in a fourth predetermined location in said data storage means.

24. The system of claim 23 wherein said processor means includes means for calculating said scaled flight data from said flight data elements and said conversion factors and storing said scaled flight data in said second predetermined location.

25. The system of claim 17 wherein said processor means additionally includes means for converting said scaled flight data into a format acceptable to said display means and means for transmitting said converted flight data to said display means.

26. The system of claim 17 wherein said data storage means includes a high speed random access memory and wherein said first and said second predetermined locations are in said high speed random access memory.

27. The system of claim 17 wherein said first predetermined location includes a first and second buffer area and wherein said processor means includes means for loading sequentially said first buffer area and then said second buffer area with said flight data words and means for sequentially loading said first buffer area with flight data words after said second buffer area has been filled with said flight data words.

28. The system of claim 17 wherein said data overflow means generates an address for storing said tentatively identified data in said predetermined location and generates a signal indicating that said tentatively identified data may be in error.

29. A system for the display of flight data derived from an aircraft flight data recorder, comprising:
   a source, on the flight data recorder, of raw flight data;
   an interface circuit, operatively connected to said source of raw flight data, for reformatting said raw flight data, said interface circuit including a serial to parallel converter circuit for converting serial data to a parallel word format;
   a counter circuit, operatively connected to said serial to parallel converter circuit, effective to generate a signal representing the number of bits of said raw flight data received by said serial to parallel converter circuit;
   a high-speed random access memory;
   a bulk memory containing programmed instructions;
   a central processing unit operatively connected to said interface circuit, said high-speed random access memory and said bulk memory, said central unit being programmed:
   (1) to cause said interface unit to load reformatted raw flight data into a first predetermined location in said high-speed random access memory;
   (2) to convert selected portions of said reformatted raw flight data into engineering units; and
   (3) to store said converted flight data in a second predetermined location in said high-speed random access memory; and
   a visual display unit, operatively connected to said central processing unit, to display said converted flight data stored in said second predetermined location in the form of a cockpit instrument array.

30. The system of claim 29 wherein said interface circuit includes a data channel controller circuit operatively connected to said counter circuit and said central processing unit effective to store an address of said first predetermined location in random access memory.

31. The system of claim 30 wherein said data channel controller circuit responds to said counter circuit to increment said address for each of said raw flight data words.

32. The system of claim 29 wherein said interface circuit includes a data channel controller circuit operatively connected to said counter circuit and said central processing unit effective to store an address of said first predetermined location in random access memory.

33. The system of claim 32 wherein said interrupt signal causes said central processing unit to transmit one of said addresses to said data channel controller circuit.

34. The system of claim 29 wherein said high-speed random access memory includes conversion tables for use in converting said reformatted raw flight data into said converted flight data.

35. The system of claim 34 wherein said bulk memory includes a parameter data base that includes said conversion tables and said central processing unit is effective to load said conversion tables into said high-speed random access memory in response to a signal from said visual display unit.

36. The system of claim 29 wherein said first predetermined location includes a buffer area which is divided into a predetermined number of subframes.

37. The system of claim 36 wherein said high-speed random access memory includes a counter and said central processor sequentially loads said reformatted raw flight data into each of said subframes, wherein said counter increments for each subframe loaded and wherein said central processing unit in response to said counter loads said reformatted raw flight data into the first of said subframes when the last subframe has been loaded.

38. The system of claim 29 wherein said high-speed random access memory includes an extracted data buffer for storing said selected portions of said reformatted raw flight data.

39. A system for displaying aircraft data from an aircraft flight data recorder comprising:
   a source of raw flight data from the flight data recorder;
   a visual display unit including a cathode ray tube and a keyboard;
   a data storage unit including conversion parameters for a plurality of aircraft types;
   processor means, operatively connected to said raw flight data source, said visual display unit and said data storage unit, for storing said raw flight data in said data storage unit, responding to a signal from said keyboard to select a set of conversion parameters from said data storage unit for a specific aircraft type and for converting said raw data to a format suitable for display on said cathode ray tube utilizing said set of conversion parameters; and
   means for displaying a cockpit instrument array on said cathode ray tube and means for displaying in real time said converted flight data in said instrument array.

40. The system of claim 39 wherein said processor means includes rate increase means for displaying said converted flight data at a rate substantially greater than real time.

41. The system of claim 40 wherein said rate increase means includes means for reducing the number of said data converted to said format suitable for display.

42. The system of claim 40 wherein said raw flight data is stored in said data storage unit in time subframes and said rate increase means selects predetermined subframes for converting said raw flight data into said format for display.

43. The system of claim 39 wherein said processor means includes means for displaying on said cathode ray tube a static yoke reference line and means for displaying in response to said converted flight data representing control column and wheel data, a position line wherein the position of the control column is represented by up-down movement of said position line with respect to said static yoke line and the wheel position by tilting said position line with respect to said static yoke line.

44. The system of claim 39 wherein selected portions of said instrument array and said converted flight data are displayed in different colors on said cathode ray tube.

45. A system for displaying aircraft data from an aircraft flight data recorder comprising:
- a source of raw flight data from the flight data recorder;
- a first data storage unit including a high speed random access memory;
- a second data storage unit including a bulk memory including a configuration file defining selected flight data for a predetermined aircraft and a parameter data base;
- a central processing unit operatively connected to said first and second data storage units effective to cause the sequential loading of blocks of said raw flight data from said raw flight data source into a first predetermined location within said first data storage unit; to cause a selected number of data conversion parameters from said parameter data base as defined by said configuration file to be loaded in a second predetermined location within said first data storage unit; to convert selected portions of said raw flight data into engineering units utilizing said selected data conversion parameters and to store said converted flight data in a third predetermined location within said first data storage unit; and
- a visual display unit including a cathode ray tube operatively connected to said central processing unit effective to write a static cockpit display on said cathode ray tube and to display said converter flight data in said static cockpit display, said central processing unit being responsive to an operator initiated signal from said visual display unit to cause said conversion of selected raw flight data to occur at a rate substantially greater than real time and wherein said display of converted flight data occurs at a rate substantially greater than real time.

46. The system of claim 45 wherein said central processing unit is additionally effective to reformat said converted flight data in said third predetermined location into flight data display instructions and coordinates and to transmit said flight data display instructions and coordinates to said visual display unit.

47. The system of claim 46 wherein said central processing unit is additionally effective to reformat selected portions of said converted flight data into ASCII format and storing said selected reformatted data in a fourth predetermined location in said first data storage unit and to transmit said selected reformatted data from said fourth predetermined location to said visual display unit for display in numerical form in said static cockpit display.

48. The system of claim 45 wherein said raw flight data source is a magnetic tape unit operatively connected to said central processing unit and wherein said central processing unit is effective to load selected blocks of said raw flight data into said first predetermined location in response to an operator initiated signal from said visual display unit.

49. The system of claim 45, wherein said configuration file includes a first portion defining data to be displayed in a real time configuration and a second portion defining data to be displayed at a second rate substantially greater than real time.

50. The system of claim 45 wherein said central processing unit is effective to cause said visual display unit to display different portions of said static display and said converted flight parameters in different colors.

* * * * *